US009159493B2

(12) United States Patent
Lynch et al.

(10) Patent No.: US 9,159,493 B2
(45) Date of Patent: Oct. 13, 2015

(54) DIELECTRICS

(75) Inventors: Richard James Lynch, Reading (GB); Matthew Adrian Brown, Basingstoke (GB); Adele Sarah Donovan, Reading (GB); Michelle Silverstone, Reading (GB)

(73) Assignee: The Secretary of State for Defense, London (GB)

( * ) Notice: Subject to any disclaimer, the term of this patent is extended or adjusted under 35 U.S.C. 154(b) by 0 days.

(21) Appl. No.: 13/634,607

(22) PCT Filed: Mar. 16, 2011

(86) PCT No.: PCT/GB2011/000366
§ 371 (c)(1),
(2), (4) Date: Sep. 13, 2012

(87) PCT Pub. No.: WO2011/114100
PCT Pub. Date: Sep. 22, 2011

(65) Prior Publication Data
US 2013/0005891 A1 Jan. 3, 2013

(30) Foreign Application Priority Data

Mar. 17, 2010 (GB) .................................. 1004393.3
Mar. 15, 2011 (GB) .................................. 1104330.4

(51) Int. Cl.
C08L 25/06 (2006.01)
H01G 13/00 (2013.01)
C08K 3/22 (2006.01)
C08F 297/02 (2006.01)
C08L 25/04 (2006.01)
H01G 4/10 (2006.01)
H01G 4/20 (2006.01)
H01H 13/00 (2006.01)
C08K 3/24 (2006.01)

(52) U.S. Cl.
CPC ........ *H01G 4/206* (2013.01); *C08K 3/24* (2013.01); *H01H 13/00* (2013.01); *C08K 3/22* (2013.01); *C08L 25/06* (2013.01)

(58) Field of Classification Search
CPC ........... C08I 25/06; C08I 25/04; H01G 13/00; H01G 4/206; C08K 3/22; C08L 25/06; C08L 25/04
USPC ............. 524/431, 408, 577, 435; 427/79, 565
See application file for complete search history.

(56) References Cited

U.S. PATENT DOCUMENTS

| 2004/0218345 | A1 | 11/2004 | Yadav et al. |
| 2005/0029515 | A1 | 2/2005 | Nagai et al. |
| 2007/0014516 | A1 | 1/2007 | Sato |
| 2007/0116976 | A1 | 5/2007 | Tan |
| 2007/0177331 | A1 | 8/2007 | Das |
| 2007/0206342 | A1 | 9/2007 | Tipton |
| 2007/0222393 | A1* | 9/2007 | Ohwada et al. ............ 315/169.2 |
| 2008/0016681 | A1 | 1/2008 | Eisenring |
| 2009/0103236 | A1 | 4/2009 | Nonaka et al. |
| 2009/0121195 | A1 | 5/2009 | Lee et al. |
| 2009/0195961 | A1 | 8/2009 | Eisenring |
| 2009/0226711 | A1 | 9/2009 | Silvi |
| 2009/0230363 | A1 | 9/2009 | Lee |
| 2009/0281224 | A1 | 11/2009 | Koh et al. |
| 2010/0157508 | A1 | 6/2010 | Lim et al. |

FOREIGN PATENT DOCUMENTS

| CN | 101490767 A | 7/2009 |
| EP | 1387367 A1 | 2/2004 |
| EP | 1867464 A1 * | 12/2007 |
| EP | 1939894 A1 | 7/2008 |
| EP | 2255961 A1 | 12/2010 |
| EP | 2305743 A1 | 4/2011 |
| JP | 63185853 A | 8/1988 |
| JP | 2005056935 A | 3/2005 |
| JP | 2006019621 A | 1/2006 |
| WO | 2006110162 A1 | 10/2006 |
| WO | 2007029605 A1 | 3/2007 |
| WO | 2008008977 A2 | 1/2008 |
| WO | 2009090943 A1 | 7/2009 |
| WO | 2010023575 A1 | 3/2010 |

OTHER PUBLICATIONS

Nordion—Gamma Compatible Materials Reference Guide—2010 http://www.nordion.com/documents/Gamma_Compatible_Materials_List.pdf.*
International Search Report dated Jun. 21, 2011 in Application No. PCT/GB2011/000366.
Search Report dated Aug. 23, 2010 in Application No. GB1004393.3.
Stober, et al., "Controlled Growth of Monodisperse Silica Spheres in the Micron Size Range," *J. Colloid Interface Sci.*, 26:62-69 (1968).
International Preliminary Report on Patentability dated Jun. 21, 2012 in Application No. PCT/GB2011/000366.
O'Dwyer, John J., "Theory of Electrical Conduction and Breakdown in Solid Dielectrics," pp. 110-156 (Chapter 4) and pp. 280-286 (select pages from Chapter 8), Sep. 13, 1973, Oxford University Press, United Kingdom.
Zhou, Cong-Hua, et al., "Titanium dioxide sols synthesized by hydrothermal methods using tetrabutyl titanate as starting material and the application in dye sensitized solar cells," *Electrochimica Acta*, 2011, pp. 4308-4314, vol. 56, Elsevier Ltd.

(Continued)

*Primary Examiner* — Ling Choi
*Assistant Examiner* — Ronald Grinsted
(74) *Attorney, Agent, or Firm* — Dean W. Russell; Kilpatrick Townsend & Stockton LLP

(57) ABSTRACT

A dielectric material (14) for a capacitor comprising a first material and a second material, the first material being a polymer and the second material comprising particles. The particles are dispersed within the polymer, and are selected to have a relative permittivity higher than that of the polymer, characterized in that the diameter of the particles is in the nanometer range and the particles are geometrically controlled to a predetermined shape.

8 Claims, 2 Drawing Sheets

(56) References Cited

OTHER PUBLICATIONS

United Kingdom Patent Application No. GB 1104401.3, Combined Search and Examination Report mailed Jun. 20, 2011, 8 pages.
United Kingdom Patent Application No. GB 1104401.3, Examination Report mailed Jul. 25, 2013, 4 pages.
Japanese Patent Application No. 2012-557599, Office Action mailed Jan. 15, 2014, 5 pages.
United Kingdom Patent Application No. GB 1104401.3, Examination Report mailed Apr. 16, 2014, 3 pages.
Chinese Patent Application No. 201180014452.X, Office Action mailed Dec. 18, 2014, 11 pages.
Japanese Patent Application No. 2012-557599, Office Action mailed Feb. 2, 2015, 3 pages.

* cited by examiner

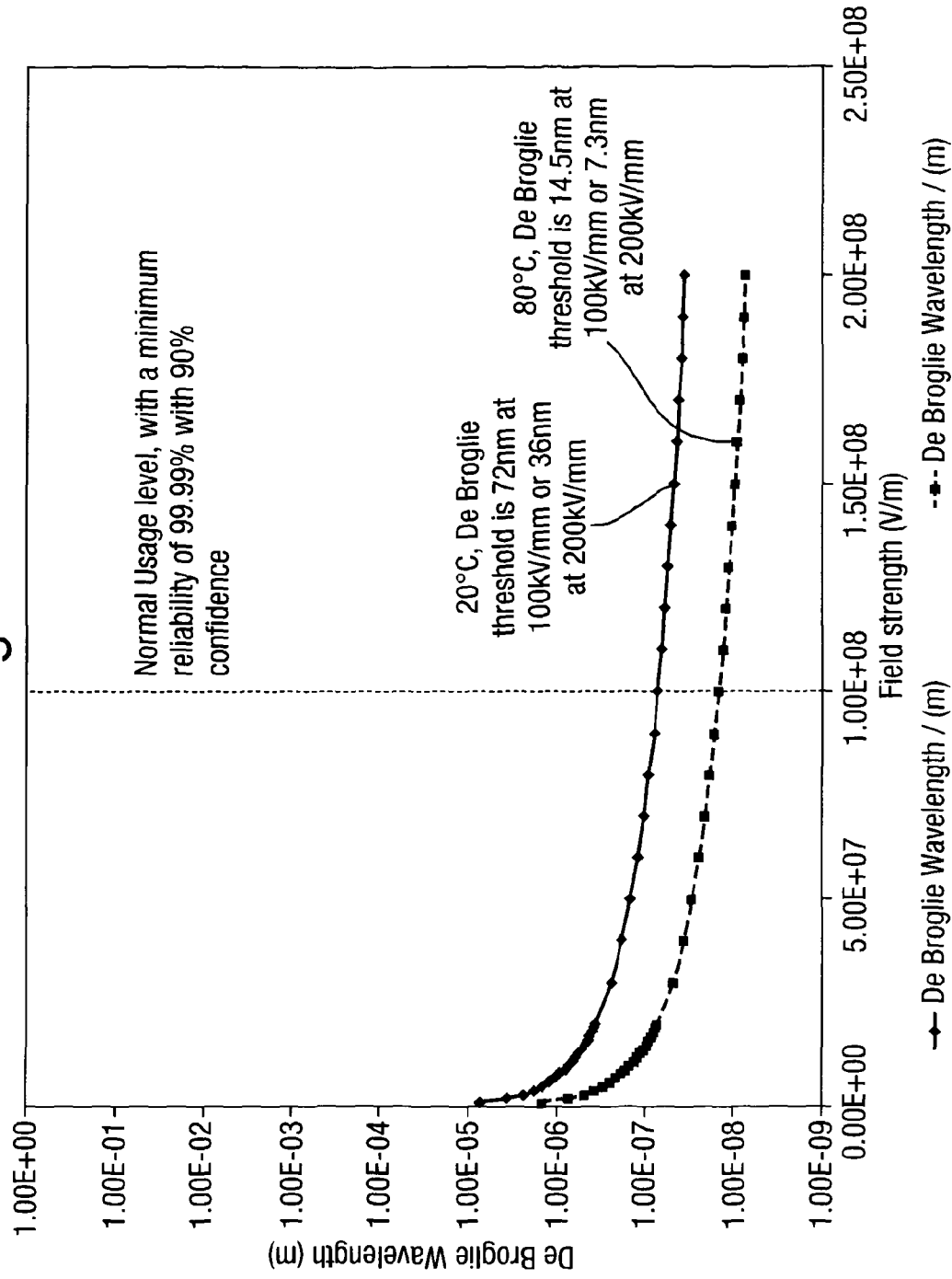

DIELECTRICS

CROSS REFERENCE TO RELATED APPLICATIONS

This application is the U.S. national phase of International Application No. PCT/GB2011/000366 filed on Mar. 16, 2011 and published in English on Sep. 22, 2011 as International Publication No. WO 2011/114100A1, which application claims priority to Great Britain Patent Application No. 1004393.3 filed on Mar. 17, 2010 and Great Britain Patent Application No. 1104330.4 filed on Mar. 15, 2011, the contents of all of which are incorporated herein by reference.

This invention relates to dielectrics and their use in capacitors. A capacitor is a means of storing electronic charge, and generally comprises two conducting plates separated by a dielectric medium. In an ideal system, the plates hold their charge until it is required to be discharged and in doing so can supply electrical energy to a system in a controlled manner.

The factors affecting capacitance are the area of the plates, their separation and the capability of the dielectric medium between them to store charge and hold off the applied voltage. The capability of the dielectric to store charge is measured in terms of its relative permittivity, that being the ability of a material to align along a field which promotes additional capability for storage of electrical energy. This in turn is a function of the material's chemical and morphological structure and, for multiphase systems, the macrostructural geometry. Permittivity is expressed as a ratio of the ability of the material to store charge compared to that of a vacuum.

Dielectrics can be made of any suitable insulating material. The greater the permittivity, and the dielectric breakdown strength, the more energy can be stored. Eventually any capacitor will fail as the potential energy rises above the dielectric strength and causes the dielectric to break down electrically.

Dielectrics are often made out of thermoplastics or thermosetting polymers. Thermoplastic materials such as polyethylene terapthalate (PET) polypropylene (PP) polycarbonate and polystyrene have all been used commercially for capacitor dielectric applications, PET and PP being the most common. Thermosetting polymers are also commonly used, either on their own or in combination with other insulating systems. These have permittivities in the range of about 2 to 3.5. Other capacitors are known such as ceramics. Ceramics tend to be brittle and often lack sufficient robustness to work effectively in non-benign environments. Additionally, they lack the flexibility of polymer based plastic dielectrics, which can be compactly wound, providing a large surface area with correspondingly higher energy storage densities, under high voltage/field conditions The permittivity of dielectric materials is frequency dependent, so that as frequency rises there is a transition from a first permittivity to a second which might have a much lower value. This is due to the manner in which dipolar molecules behave in an electrical field, in addition to electronic and ionic conduction mechanisms. As the field is established, the dipolar molecules move to align themselves along and against the field lines, and in so doing they increase the energy storage capacity of the material. This mechanism enables more energy storage in the capacitor. In an AC system the sinusoidal field causes the molecules to change alignment in accordance with the frequency. However, as the frequency rises, the molecules dipoles have an increasing phase lag as a consequence of the dipoles natural thermodynamic response, so that the molecule cannot move quickly enough and the capacitor becomes more lossy. At a given frequency the dielectric loss peaks. Above this frequency, the loss reduces as the phase lag diminishes as a consequence of dipoles having reduced orientational displacement from the equilibrium position as the field changes direction over the AC cycle. This phenomenon is commonly described as Debye Dispersion, and can be described in the non-ideal case by the Havriliak and Negami semi-empirical relationship for a single isolated relaxation response.

$$\varepsilon^* = \varepsilon' - i\varepsilon'' = \varepsilon_\infty + \frac{\varepsilon_l - \varepsilon_\infty}{(1 - (i\omega\tau)^{(1-\alpha)})^\beta}$$

As the voltage increases across a capacitor, the energy rises with the square of the voltage and therefore at higher voltages it is possible to markedly raise the energy density storage of the capacitor. However, as noted above, as voltage increases there is a tendency for the dielectric to break down and thus high voltage, high energy capacitors are difficult to manufacture with any reliability.

A further disadvantage to using polymers is that in many applications a capacitor might need to work in an environment of high ionising radiation, and few polymers retain their capability to function in such environments. This is because the energy absorbed from incident radiation causes the material both to chemically degrade and to promote electrons into higher electronic states, thereby increasing their ability to ionise or to establish conduction paths, thereby discharging or partially discharging the capacitor. The dc conduction response of the dielectric can be incorporated into the full complex permittivity (equation above), and is shown below.

$$\varepsilon^* = \varepsilon' - i\varepsilon'' = \varepsilon_\infty + \frac{\varepsilon_l - \varepsilon_\infty}{(1 - (i\omega\tau)^{(1-\alpha)})^\beta} - i\frac{\sigma}{\varepsilon_0 \omega}$$

It is an objective of the present invention to overcome these difficulties by providing a physically robust capacitor possessing a dielectric medium which enables high energy density storage, at high voltage, which will operate reliably even in radiation environments Accordingly, the present invention provides for a dielectric material for a capacitor comprising a first material A and a second material B, material A being a polymer and material B comprising particles, said particles being dispersed within the polymer, said particles having a relative permittivity higher than that of the polymer, characterised in that the diameter of the particles is in the nanometer range and selected to be below the DeBroglie wavelength for the polymer matrix, which is crystallised in a manner to advantageously control the morphology.

Such a dielectric, used in a capacitor enables extremely high electrical fields. This means that the energy density and voltage may be elevated to very high levels, with many industrial benefits.

As the particle size approaches the deBroglie wavelength of electrons at or below a certain field strength, the particles behave to the electrons as though 'smeared' throughout the plastic, thereby significantly raising the overall permittivity whilst maintaining the flexibility of the dielectric. The deBroglie wavelength of the composite is determined by the electron mobility in the material and the applied electric field—i.e. the electron drift velocity. As the electron mobility is a function of both the base polymer and the material morphology it is important to ensure correct crystallisation out of the molten polymer for the extruded film, which demands a controlled thermo dynamic environment. The deBroglie wavelength can be altered by orders of magnitude simply by altering the crystallisation conditions.

The high permittivity material might advantageously be a titanium dioxide, as this has good resistance to radiation and therefore can be used in a high radiation environment. It is also non toxic and widely available as a commercial staple product Advantageously, a polymer such as polystyrene is radiation tolerant, and this means that the invention provides for construction of such capacitors for a range of applications that might previously have required significant shielding. Examples of where such hardening would be advantageous include the use of capacitors in satellites, in nuclear facility applications where the radiation environment might be extreme, for example criticality incident detection devices, and medical applications such as in CT scanners.

The overall permittivity of the composite containing the $TiO_2$ is potentially an order of magnitude higher than the base polymer. The exact value would depend upon the formulation and would be application specific. For illustration, $TiO_2$ has a permittivity of about 100, and Polystyrene has a permittivity of about 2.5 at 1 kHz. Where these materials are mixed so that the nanoparticles form about 1-3% by weight distributed throughout the material, energy storage of 1 $J/cm^3$ is easily achieved.

The generic material may be selected and tuned to a specific energy storage density depending upon the desired application. For example, a polymer containing 2% by weight $TiO_2$ can be manufactured with different sizes of nano-particles and can be subjected to different surface treatments. A formulation with smaller nano-particles would exhibit better radiation tolerance but would have a lower leakage current. Conversely, larger nano particles would promote a better bleed resistance by giving rise to a larger leakage current, but the radiation tolerance of the capacitor would be diminished. Furthermore, larger particles in the matrix lead to greater temperature sensitivity, but are easier to manufacture.

Changes in particle material also allows for changes in application. Incorporation of differing particles can lead to piezzo-electric devices with all the inherent advantages of flexible polymer films.

Clearly, higher energy density capacitors can be manufactured by using particles of a higher permittivity material. An example of such a material would be lead-manganese-niobate lead titanate ($PbMnNbO_3$ $PbTiO_3$ or PNM-PT) which has a relative permittivity of about 20000. However, the ease of sourcing other materials and the challenges of producing nano particle sized samples of PNM-PT on a commercial scale would indicate that such materials would only be necessary in extreme circumstances.

For capacitor type applications the device can now be formed from very thin layers of conducting materials of micron thickness around a thin dielectric. These can be formed into long ribbons that may be metres in length and wound into a compact unit. The result is a capacitor that can act as a very high energy storage medium at very high voltages.

The capacitor created possesses a very low inductance (below 100 nano Henrys). This allows it to be configured to discharge its stored charge rapidly, making it suitable for use in camera flashes, or in aviation navigation lights for example. Other examples exist where there might be an advantage in delivering a high energy surge—these examples include ignition systems for internal combustion engines in aviation motive power and power generation.

It is also possible to produce systems that are fail-safe in the event of a lightning strike or a fire. Sometimes, for example in detonation systems, it is desirable to have a system fail rather than be set off erroneously. By ensuring that the dielectric fails rapidly the capacitor containing the dielectric can be made to fail safely, protecting the operators of the system from unwanted unplanned electrical discharge. As the polymer can be selected so that it fails rapidly in the event of an energy surge or fire, fail-safe high energy density capacitors can be provided.

The capacitor made according to the invention can be charged to working voltage extremely quickly, in a matter of seconds, and therefore might allow for the use of capacitors in some applications, such as electric propulsion for cars, which were previously provided by batteries.

An embodiment of the invention will now be described with reference to the following drawings;

FIG. 4 shows the relationship between de Broglie wavelength and field strength

Figure 1:
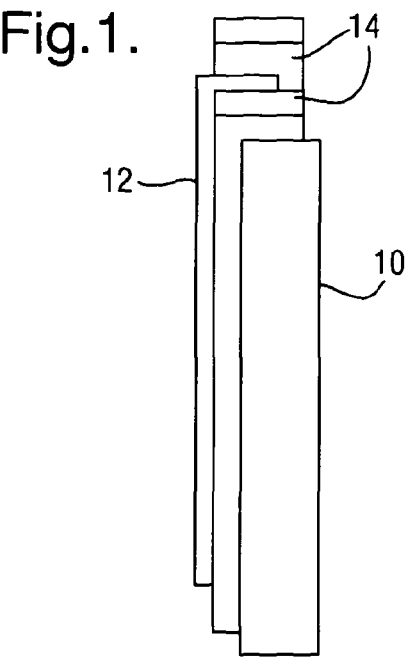
FIG. 1 shows a general arrangement of a type of capacitor
Figure 2:
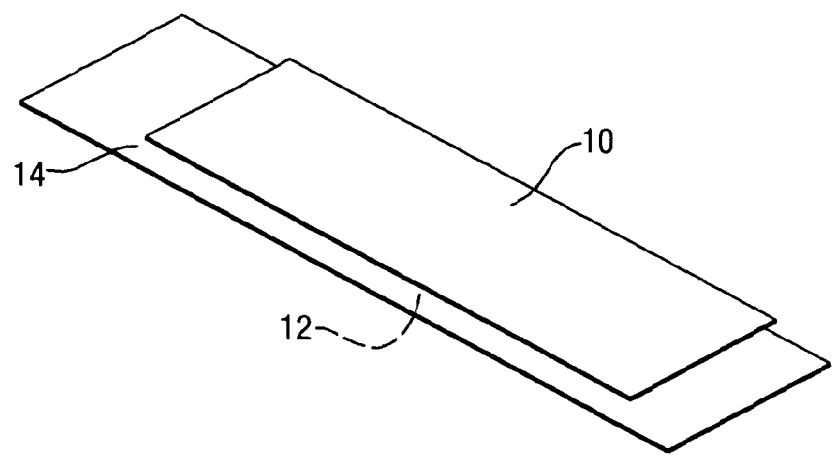
FIG. 2 shows a more detailed arrangement of such a capacitor

The capacitor in shown in FIG. 1 has two conducting portions (10) (12) separated by a dielectric ribbon (14). The conducting portions in this case are 5 µm thick aluminium. The dielectric in this case is a mixture of polystyrene and 2% by weight nano sized particles of TiO2. The thickness of the dielectric can be chosen to meet the required voltage, reliability and capacitance, but is generally of the order of less than 100 µm. In the case of the present embodiment the thickness is of the order of 30 µm.

Polystyrene is selected as it enables the mixture to be extruded onto the aluminium ribbon. This also enables one of the two failure modes to be mitigated. Failures tend to occur through 'punch through' of electric charge flow between the plates and 'flash over', when charge flows along a plate and jumps at the edges. By heating the ribbon under high pressure, the polystyrene contracts reorienting the material, so that it bonds at the edges preventing such flash over. The construction shown has a dielectric beneath the lower layer (12). When wound this allows constant dielectric-conducting plate dielectric, so that both surfaces of the conducting plates become used, maximising the surface area.

In order to ensure homogenous mixing of the TiO2 particles it is necessary to generate high shear rates in the polymer during mixing. In this case this is achieved through ultrasonic cavitation, which generates very high shear rate pulses through the material, above that which can be achieved through conventional mechanical mixing.

By controlling the geometry of the TiO2 particles to a fixed diameter and shape certainty about the performance of the capacitor can be gained. Spherical are advantageous in that they have isotropic effect. i.e. their effect is independent of their orientation in the polymer. It is known that small diameter spherical particles can be created by using the Stöber process (W. Stöber, A. Fink, E. Bohn, J Colloid Interface Sci. 26 (1968) 62). This can produce particles of approximately 100 nm diameter. Clearly is advantageous to reduce the particle diameter in a way that ensures spherical particles with small deviation from a mean diameter.

Application GB 1104330.4 sets out a method of route to the preparation of monodisperse ~20 nm $TiO_2$ using titanium isopropoxide as the precursor (TTIP-$Ti(OCH(CH_3)_2)_4$). The TTIP is mixed with water and actetic acid and heated at moderate temperatures (~80° C.). The use of acetic acid acts to reduce the rate of hydrolysis, condensation and aggregation of $TiO_2$ through a transesterification process forming a $Ti(OiPr)_x(OAc)_y$ intermediate. The condensation process may be completed by hydrothermally treating this solution in an autoclave at a higher temperature (~250° C.) to obtain a stable solution of the desired particles.

The polymer is cooled in a controlled manner. As a liquid polymer cools and solidifies, crystals grow and join up. Slow cooling promotes spherulites—large polymer crystals. Crystalline structure adversely affects electron mobility so it is advantageous to suppress their creation. This is done by ensuring a rapid cooling of the polymer melt.

Figure 3:
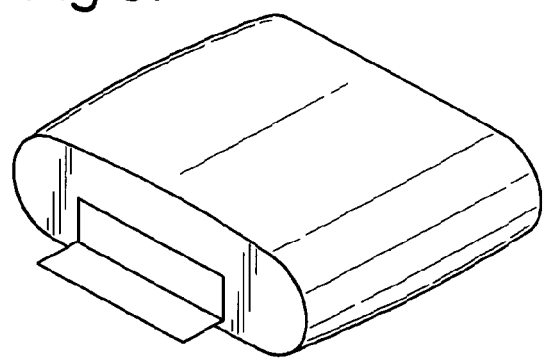
FIG. 3 is a shows an isometric view of such a capacitor ready for use

Once the polymer is dry and in the correct physical form, it is then extruded. The capacitor is tightly wound to make it more compact, covered in a protecting insulating layer and then connected to the circuit as required. A complete capacitor is shown in FIG. 3.

FIG. 4 shows the particle size threshold as a function of field strength. The reduction in the deBroglie Wavelength as a function of field is a consequence of the increasing conductivity of the system, as the electron mobility increases. Thus for a desired field strength, by controlling the geometry of particles so that they do not act as electrical stress enhancers, a capacitors dielectric can be 'tuned' to a desired performance level.

The invention claimed is:

1. A dielectric material for a capacitor comprising a polymer and particles, said particles being dispersed within the polymer, said particles having a relative permittivity higher than that of the polymer, wherein the diameter of the particles is geometrically controlled to be below the deBroglie wavelength for the electrons in the polymer.

2. A dielectric material as described in claim 1 in which the polymer is a thermoplastic.

3. A dielectric material as described in claim 1 in which the polymer is a thermosetting polymer.

4. A dielectric material as described in claim 2 in which the polymer is polystyrene.

5. A dielectric material as described in claim 1 in which the particles are spherical.

6. A dielectric material as described in claim 1 in which the particles are titanium dioxide particles.

7. A dielectric material as described in claim 1 in which the particles are lead-manganese-niobate lead titanate particles.

8. A dielectric material as described in claim 1 wherein the polymer is selected to ensure the capacitor is hardened against ionising radiation.

* * * * *